US012725730B2

(12) United States Patent
Nakano

(10) Patent No.: US 12,725,730 B2
(45) Date of Patent: Sep. 1, 2026

(54) ELECTRONIC COMPONENT

(71) Applicant: Murata Manufacturing Co., Ltd., Kyoto-fu (JP)

(72) Inventor: Maasa Nakano, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 827 days.

(21) Appl. No.: 18/191,779

(22) Filed: Mar. 28, 2023

(65) Prior Publication Data

US 2023/0317361 A1 Oct. 5, 2023

(30) Foreign Application Priority Data

Mar. 31, 2022 (JP) ................................ 2022-059885

(51) Int. Cl.

| | |
|---|---|
| ***H01F 1/14*** | (2006.01) |
| ***H01F 1/147*** | (2006.01) |
| ***H01F 27/28*** | (2006.01) |
| ***H01F 27/29*** | (2006.01) |
| ***H01F 27/32*** | (2006.01) |

(52) U.S. Cl.
CPC ....... *H01F 27/292* (2013.01); *H01F 1/14708* (2013.01); *H01F 27/2804* (2013.01); *H01F 27/323* (2013.01); *H01F 2027/2809* (2013.01)

(58) Field of Classification Search
CPC ............... H01F 27/292; H01F 1/14708; H01F 27/2804; H01F 27/323; H01F 2027/2809
See application file for complete search history.

(56) References Cited

U.S. PATENT DOCUMENTS

2014/0070912 A1* 3/2014 Moriyama .......... H01F 17/0006 336/83
2020/0176170 A1* 6/2020 Terauchi ............. H01F 27/2804
2022/0037075 A1* 2/2022 Arai ...................... H01F 27/292
2022/0310301 A1* 9/2022 Oide ..................... H01F 27/085

FOREIGN PATENT DOCUMENTS

JP H10144526 A * 5/1998
JP 2019-210204 A 12/2019
JP 2021100098 A * 7/2021

OTHER PUBLICATIONS

Japanese Patent Office Decision to Grant a Patent (Translated) 2024 (Year: 2024).*

* cited by examiner

*Primary Examiner* — Malcolm Barnes
(74) *Attorney, Agent, or Firm* — Studebaker Brackett PLLC

(57) ABSTRACT

An electronic component includes an insulator portion in which insulating layers are laminated; inner conductors each having a strip shape and embedded in the insulator portion; and first and second external electrodes which face an outer surface of the insulator portion and are electrically connected to the inner conductors. Also, from 3 to 5 of the inner conductors are provided and the inner conductors being laminated with the insulating layers interposed therebetween, a total sectional area of the inner conductors is from 0.1 $mm^2$ to 0.5 $mm^2$, and when a thickness and a width of the inner conductor are designated as t1 and w4, respectively, a distance between the inner conductors is designated as t2, t1/w4 is designated as x, and t2/t1 is designated as y. When the number of the inner conductors is 3, (x,y) is a region surrounded by A(0.051,1.0), B(0.051,5.9), C(0.2, 5.9), D(0.2,4.4), and E(0.1,1.4).

20 Claims, 7 Drawing Sheets

ELECTRONIC COMPONENT

CROSS-REFERENCE TO RELATED APPLICATION

This application claims benefit of priority to Japanese Patent Application No. 2022-059885, filed Mar. 31, 2022, the entire content of which is incorporated herein by reference.

BACKGROUND

Technical Field

The present disclosure relates to an electronic component.

Background Art

As an electronic component, an electronic component including a plurality of strip-shaped inner conductors inside an element body is known, as described in Japanese Patent Application Laid-Open No. 2019-210204. Japanese Patent Application Laid-Open No. 2019-210204 discloses an electronic component including strip-shaped inner conductors in which an extended portion to an end surface of a laminate is wide in FIGS. 2 and 5. According to this electronic component, a cutting blade and a dicer can be suppressed from being damaged at the time of cutting a mother laminate, a direct-current resistance value can be reduced, and the laminate can be suppressed from being deformed.

SUMMARY

In the electronic component of Japanese Patent Application Laid-Open No. 2019-210204, it is necessary to increase a sectional area of a coil conductor in order to increase a value of the flowing current. However, when a sectional area of an inner conductor is increased, stress increases near the inner conductor due to a difference in linear expansion coefficient between the insulating layer and the inner conductor, and the stress may cause cracks in the element body.

Accordingly, the present disclosure provides an electronic component having a plurality of inner conductors each having a strip shape inside an element body, in which cracks are less likely to occur in the element body when the sectional area of the inner conductor is increased.

The present disclosure includes the following aspects.

[1] An electronic component including an insulator portion in which a plurality of insulating layers are laminated; a plurality of inner conductors each having a strip shape and embedded in the insulator portion; and a first external electrode and a second external electrode provided to face an outer surface of the insulator portion and electrically connected to the inner conductors. Also, 3 or more and 5 or less (i.e., from 3 to 5) of the inner conductors are provided and the inner conductors being laminated with the insulating layers interposed therebetween. A total sectional area of the plurality of inner conductors being 0.1 $mm^2$ or more and 0.5 $mm^2$ or less (i.e., from 0.1 $mm^2$ to 0.5 $mm^2$), and when a thickness and a width of the inner conductor are designated as t1 and w4, respectively, a distance between the inner conductors is designated as t2, t1/w4 is designated as x, and t2/t1 is designated as y. In addition, (i) when the number of the inner conductors is 3, (x,y) is a region surrounded by A(0.051,1.0), B(0.051,5.9), C(0.2,5.9), D(0.2,4.4), and E(0.1,1.4). Furthermore, (ii) when the number of the inner conductors is 4, (x,y) is a region surrounded by F(0.038, 0.26), G(0.038,5.2), H(0.2,5.2), I(0.2,4.9), and J(0.1,1.9), and (iii) when the number of the inner conductors is 5, (x,y) is a region surrounded by K(0.031,0.53), L(0.031,4.9), M(0.15,4.9), and N(0.15,4.1).

[2] The electronic component described in [1], in which each of the inner conductors has a line portion and a first extended portion and a second extended portion located at both ends of the line portion, a ratio of a width of each of the first extended portion and the second extended portion to a width of the insulator portion is 0.4 or more and 1.0 or less (i.e., from 0.4 to 1.0).

[3] The electronic component described in [1] or [2], in which a height of the insulator portion is 1.8 mm or more and 2.2 mm or less (i.e., from 1.8 mm to 2.2 mm), and a width of the insulator portion is 2.3 mm or more and 2.7 mm or less (i.e., from 2.3 mm to 2.7 mm).

[4] The electronic component described in any one of [1] to [3], in which each of the insulating layers includes a magnetic layer containing 40 mol % or more and 49.5 mol % or less (i.e., from 40 mol % to 49.5 mol %) of Fe in terms of $Fe_2O_3$, 2 mol % or more and 35 mol % or less (i.e., from 2 mol % to 35 mol %) of Zn in terms of ZnO, 6 mol % or more and 13 mol % or less (i.e., from 6 mol % to 13 mol %) of Cu in terms of CuO, and 10 mol % or more and 45 mol % or less (i.e., from 10 mol % to 45 mol %) of Ni in terms of NiO.

[5] The electronic component described in any one of [1] to [4], in which each of the insulating layers includes a non-magnetic layer.

[6] The electronic component described in [5], in which the non-magnetic layer contains 40 mol % or more and 49.5 mol % or less (i.e., from 40 mol % to 49.5 mol %) of Fe in terms of $Fe_2O_3$, 6 mol % or more and 13 mol % or less (i.e., from 6 mol % to 13 mol %) of Cu in terms of CuO, and 37.5 mol % or more and 54 mol % or less (i.e., from 37.5 mol % to 54 mol %) of Zn in terms of ZnO.

According to the present disclosure, it is possible to provide an electronic component in which cracks are less likely to occur in the vicinity of an inner conductor of an element body.

DETAILED DESCRIPTION

Hereinafter, an electronic component of the present disclosure will be described in detail with reference to the drawings. However, the shape, arrangement, and the like of the electronic component and each constituent element of the present embodiment are not limited to the illustrated example.

Embodiment 1

Figure 1:
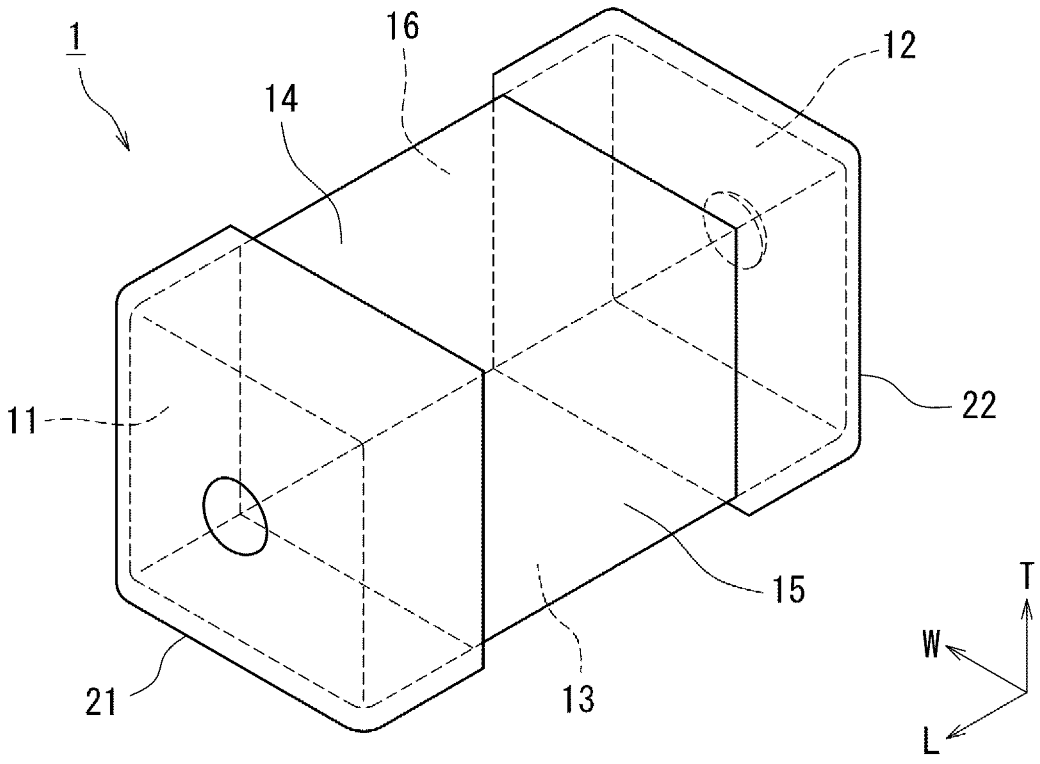
FIG. 1 is a perspective view schematically illustrating an electronic component according to Embodiment 1 of the present disclosure.
Figure 2:
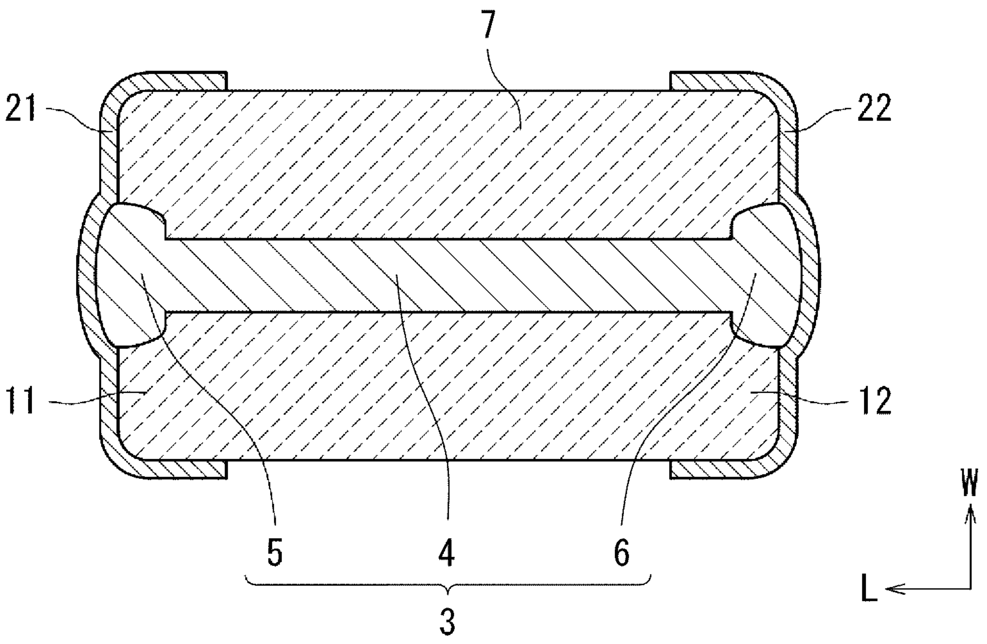
FIG. 2 is a sectional view parallel to an LW plane of the electronic component illustrated in FIG. 1.
Figure 3:
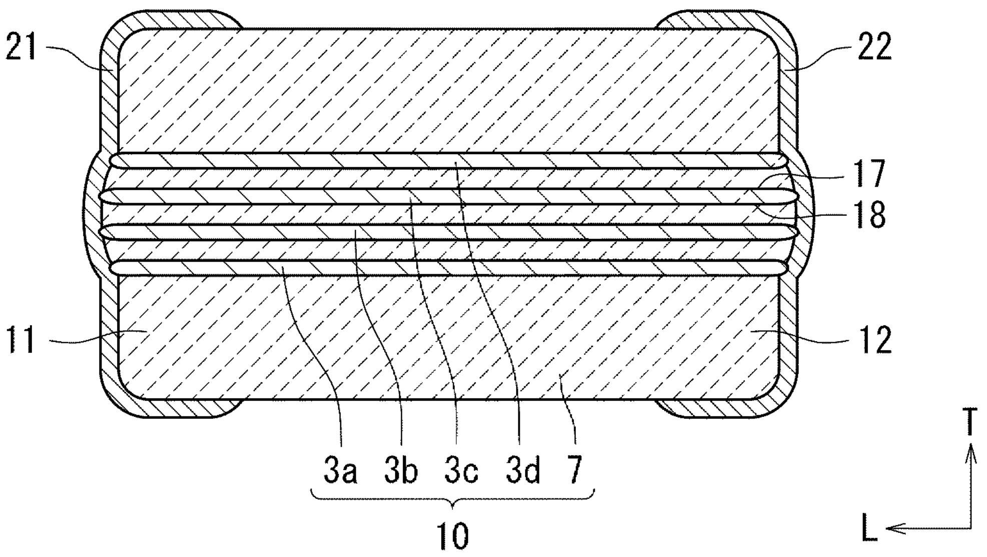
FIG. 3 is a sectional view parallel to an LT plane of the electronic component illustrated in FIG. 1.
Figure 4:
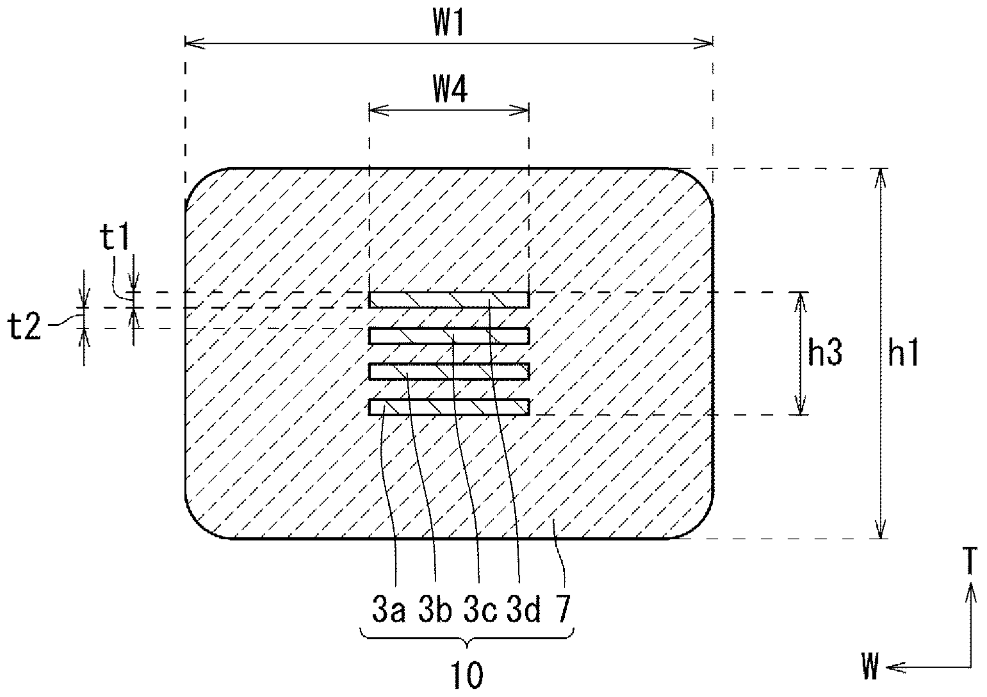
FIG. 4 is a sectional view parallel to a WT plane of the electronic component illustrated in FIG. 1.
Figure 5:
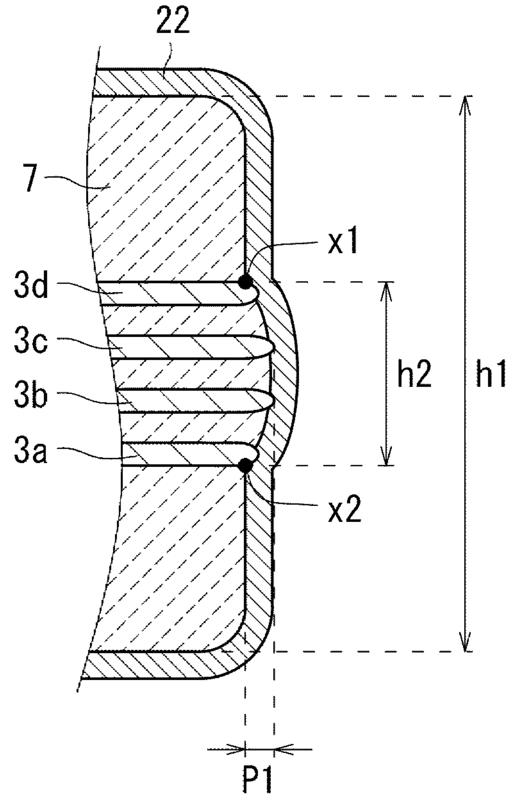
FIG. 5 is a partial enlarged view of the sectional view illustrated in FIG. 3.
Figure 6:
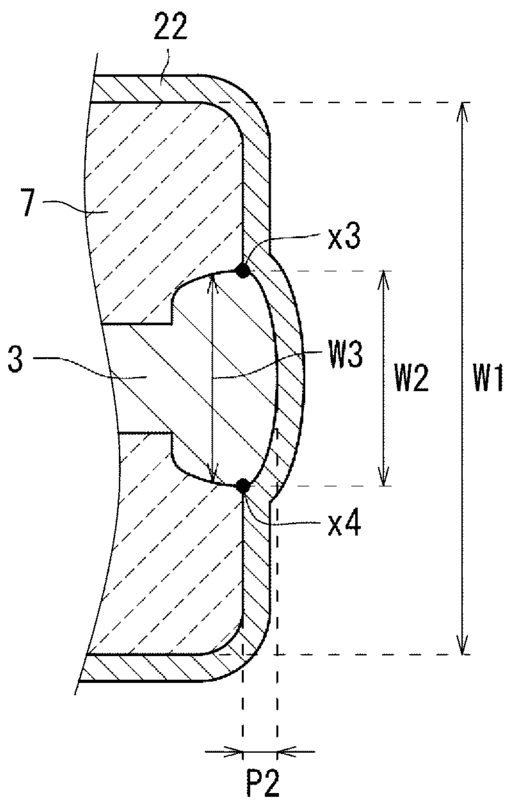
FIG. 6 is a partial enlarged view of the sectional view illustrated in FIG. 2.

A perspective view of an electronic component 1 of the present embodiment is shown in FIG. 1, a sectional view parallel to an LW plane is shown in FIG. 2, a sectional view parallel to an LT plane is shown in FIG. 3, and a sectional view parallel to a WT plane is shown in FIG. 4. However, the shape, arrangement, and the like of the electronic component and each constituent element of the following embodiment are not limited to the illustrated example.

As illustrated in FIGS. 1 to 4, the electronic component 1 of the present embodiment is an electronic component having a substantially rectangular parallelepiped shape. The electronic component 1 schematically includes an insulator portion 7, a plurality of inner conductors 3 embedded in the insulator portion 7, and a first external electrode 21 and a second external electrode 22 provided at both end surfaces of the insulator portion 7. The insulator portion 7 has a substantially rectangular parallelepiped shape. In the insulator portion 7, two surfaces perpendicular to an L axis of FIG. 1 are referred to as a first end surface and a second end surface, respectively, surfaces perpendicular to a W axis are referred to as a first side surface and a second side surface, and surfaces perpendicular to a T axis are referred to as an upper surface and a lower surface, respectively. The inner conductor 3 includes a line portion 4, a first extended portion 5, and a second extended portion 6. The inner conductor 3 is electrically connected to the first external electrode 21 in the first extended portion 5 and is electrically connected to the second external electrode 22 in the second extended portion 6.

The electronic component of the present disclosure preferably has a length (L) of 2.5 mm or more and 4.0 mm or less (i.e., from 2.5 mm to 4.0 mm), a width (W) of 2.0 mm or more and 3.0 mm or less (i.e., from 2.0 mm to 3.0 mm), and a height (T) of 1.5 mm or more and 2.5 mm or less (i.e., from 1.5 mm to 2.5 mm), and more preferably a length of 2.8 mm or more and 3.5 mm or less (i.e., from 2.8 mm to 3.5 mm), a width of 2.3 mm or more and 2.7 mm or less (i.e., from 2.3 mm to 2.7 mm), and a height of 1.8 mm or more and 2.2 mm or less (i.e., from 1.8 mm to 2.2 mm).

(Insulator Portion)

In the electronic component 1 of the present embodiment, the insulator portion 7 is configured by laminating a plurality of insulating layers. The insulating layers are laminated in a T direction of FIG. 1.

The insulating layer includes a magnetic layer.

The magnetic layer contains at least Fe, Zn, Cu, and Ni.

The magnetic layer is configured by a sintered magnetic material containing at least Fe, Zn, Cu, and Ni as main components.

The main component refers to a component that accounts for most of the whole components contained in the magnetic layer. Typically, the main component is contained in an amount exceeding 50 mass % in total with respect to the whole components contained in the magnetic layer.

In the sintered magnetic material, the Fe content may be preferably 40.0 mol % or more and 49.5 mol % or less (i.e., from 40.0 mol % to 49.5 mol %) (based on the total main components, the same applies hereinafter), and more preferably 45.0 mol % or more and 49.5 mol % or less (i.e., from 45.0 mol % to 49.5 mol %), in terms of $Fe_2O_3$.

In the sintered magnetic material, the Zn content may be preferably 2.0 mol % or more and 35.0 mol % or less (i.e., from 2.0 mol % to 35.0 mol %) (based on the total main components, the same applies hereinafter), and more preferably 5.0 mol % or more and 30.0 mol % or less (i.e., from 5.0 mol % to 30.0 mol %), in terms of ZnO.

In the sintered magnetic material, the Cu content is preferably 6.0 mol % or more and 13.0 mol % or less (i.e., from 6.0 mol % to 13.0 mol %) (based on the total main components, the same applies hereinafter), and more preferably 7.0 mol % or more and 10.0 mol % or less (i.e., from 7.0 mol % to 10.0 mol %), in terms of CuO.

In the sintered magnetic material, the Ni content is not particularly limited, may be the balance of Fe, Zn, and Cu as the other main components described above, and is preferably 10.0 mol % or more and 45.0 mol % or less (i.e., from 10.0 mol % to 45.0 mol %) (based on the total main components, the same applies hereinafter), and more preferably 15.0 mol % or more and 40.0 mol % or less (i.e., from 15.0 mol % to 40.0 mol %), in terms of NiO.

By setting the contents of Fe, Zn, Cu, and Ni in the magnetic layer in the above ranges, excellent electrical characteristics can be obtained.

In the present disclosure, the sintered magnetic material may further contain an additive component. Examples of the additive component in the sintered magnetic material include Mn, Co, Sn, Bi, and Si, but are not limited thereto. The contents (addition amounts) of Mn, Co, Sn, Bi, and Si are preferably 0.1 parts by mass or more and 1 part by mass or less (i.e., from 0.1 parts by mass to 1 part by mass) in terms of $Mn_3O_4$, $CO_3O_4$, $SnO_2$, $Bi_2O_3$, and $SiO_2$, respectively, with respect to 100 parts by mass of the total of the main components (Fe (in terms of $Fe_2O_3$), Zn (in terms of ZnO), Cu (in terms of CuO), and Ni (in terms of NiO)). The sintered magnetic material may further contain impurities unavoidable in production.

A distance between an upper surface 14 and a lower surface 13 of the insulator portion 7, that is, a height h1 of the insulator portion 7 is preferably 1.8 mm or more and 2.2 mm or less (i.e., from 1.8 mm to 2.2 mm).

A distance between a first side surface 15 and a second side surface 16 of the insulator portion 7, that is, a width w1 of the insulator portion 7 is preferably 2.3 mm or more and 2.7 mm or less (i.e., from 2.3 mm to 2.7 mm).

In an aspect, the height h1 of the insulator portion 7 is 1.8 mm or more and 2.2 mm or less (i.e., from 1.8 mm to 2.2 mm), and the width w1 of the insulator portion 7 is 2.3 mm or more and 2.7 mm or less (i.e., from 2.3 mm to 2.7 mm).

The size of the insulator portion 7 is not particularly limited, and preferably, the height h1 of the insulator portion 7 is 1.8 mm or more and 2.2 mm or less (i.e., from 1.8 mm to 2.2 mm) and the width w1 of the insulator portion 7 is 2.3 mm or more and 2.7 mm or less (i.e., from 2.3 mm to 2.7 mm).

(Inner Conductor)

A plurality of inner conductors 3 each having a strip shape are embedded in the insulator portion 7. The strip shape refers to a surface shape having a length and a width.

The inner conductor 3 may have a length in an L axis direction, a width in a W axis direction, and a thickness in a T axis direction, and each axis thereof may be a linear axis. The inner conductor 3 has a first main surface 17 which is a main surface on the upper surface 14 side and a second main surface 18 which is a main surface on the lower surface 13 side.

The inner conductor 3 has the line portion 4 and the first extended portion 5 and the second extended portion 6 located at both ends of the line portion 4. The first extended portion 5 is exposed on a first end surface 11 and is electrically connected to the first external electrode 21. The second extended portion 6 is exposed on a second end surface 12 and is electrically connected to the second external electrode 22.

A plurality of the inner conductors 3 exist and are laminated with insulating layers interposed therebetween. With such a structure, the electronic component of the present disclosure exhibits a coil-like function. The respective laminated inner conductors are disposed at substantially the same position in top view. The term "substantially the same position" includes a state in which most, for example, 90% or more of the area in top view overlaps in addition to exactly matching.

The number of the inner conductors 3 is preferably 3 or more and 5 or less (i.e., from 3 to 5) and more preferably 4 or 5.

The total sectional area of the line portions 4 of the inner conductors 3 is preferably 0.1 $mm^2$ or more and 0.5 $mm^2$ or less (i.e., from 0.1 $mm^2$ to 0.5 $mm^2$). By setting the total sectional area of the line portions 4 to 0.1 $mm^2$ or more, the resistance value of the inner conductor can be reduced. By setting the total sectional area of the line portions 4 to 0.5 $mm^2$ or less, the electronic component 1 can be further reduced in size.

A thickness t1 of the line portion 4 of the inner conductor 3 is preferably 0.03 mm or more and more preferably 0.04 mm or more. The thickness t1 of the line portion 4 of the inner conductor 3 is preferably 0.1 mm or less, more preferably 0.09 mm or less, and further preferably 0.08 mm or less. In an aspect, the thickness t1 of the line portion 4 of the inner conductor 3 may be preferably 0.03 mm or more and 0.1 mm or less (i.e., from 0.03 mm to 0.1 mm) and more preferably 0.04 mm or more and 0.08 mm or less (i.e., from 0.04 mm to 0.08 mm).

A distance between the line portions 4 of the inner conductors 3 (in other words, a thickness of the insulating layer between the line portions 4 of the inner conductors 3) t2 is preferably 0.01 mm or more and 0.6 mm or less (i.e., from 0.01 mm to 0.6 mm), more preferably 0.07 mm or more and 0.48 mm or less (i.e., from 0.07 mm to 0.48 mm), and further preferably 0.10 mm or more and 0.36 mm or less (i.e., from 0.10 mm to 0.36 mm). By setting such a distance t2 between the line portions to 0.01 mm or more, insulation between the inner conductor layers can be more reliably ensured. By setting such a distance t2 between the line portions to 0.6 mm or less, more excellent electrical characteristics can be obtained.

A width w4 of the line portion 4 of the inner conductor 3 is preferably 0.3 mm or more and 2.0 mm or less (i.e., from 0.3 mm to 2.0 mm), more preferably 0.5 mm or more and 1.5 mm or less (i.e., from 0.5 mm to 1.5 mm), and further preferably 0.6 mm or more and 1.3 mm or less (i.e., from 0.6 mm to 1.3 mm).

A width w3 of the extended portion of the inner conductor 3 is preferably 0.5 mm or more and 2.5 mm or less (i.e., from 0.5 mm to 2.5 mm), more preferably 0.8 mm or more and 2.5 mm or less (i.e., from 0.8 mm to 2.5 mm), and further preferably 1.0 mm or more and 2.0 mm or less (i.e., from 1.0 mm to 2.0 mm).

A ratio (h3/h1) of a distance h3 between the first main surface 17 of the line portion 4 of an inner conductor **3*d* closest to the upper surface 14 of the insulator portion 7 and the second main surface 18 of the line portion 4 of an inner conductor 3*a* closest to the lower surface 13 of the insulator portion 7 to the height h1 of the insulator portion 7** is preferably 0.25 or more and 0.55 or less (i.e., from 0.25 to 0.55) and more preferably 0.30 or more and 0.45 or less (i.e., from 0.30 to 0.45). By setting h3/h1 in the above range, the occurrence of cracks in the insulator portion and the external electrode can be suppressed.

A ratio (w3/w1) of the width w3 of the extended portion of the inner conductor 3 to the width w1 of the insulator portion 7 is preferably 0.40 or more and 1.0 or less (i.e., from 0.40 to 1.0), more preferably 0.40 or more and less than 1.0 (i.e., from 0.40 to 1.0), and further preferably 0.50 or more and 0.80 or less (i.e., from 0.50 to 0.80).

w3 is a width at substantially the center of the extended portion in an axis direction (that is, the L axis direction) of the inner conductor. w3 is a width of an inner conductor located at the center in a lamination direction among the inner conductors. For example, when there are five inner conductors, w3 is the width of the third inner conductor from the upper surface 14 or the lower surface 13. When the number of inner conductors is an even number, w3 is an average of two widths at the center, that is, an average of two widths of inner conductors **3*b* and 3*c*** in the illustrated example.

By setting w3/w1 in the above range, the occurrence of cracks in the insulator portion and the external electrode can be suppressed.

When the thickness of the inner conductor is designated as t1, the width thereof is designated as w4, the distance between the inner conductors is designated as t2, t1/w4 is designated as x, and t2/t1 is designated as y, (i) when the number of the inner conductors is 3,
(x,y) is a region surrounded by A(0.051,1.0), B(0.051, 5.9), C(0.2,5.9), D(0.2,4.4), and E(0.1,1.4),
(ii) when the number of the inner conductors is 4,
(x,y) is a region surrounded by F(0.038,0.26), G(0.038, 5.2), H(0.2,5.2), I(0.2,4.9), and J(0.1,1.9), and
(iii) when the number of the inner conductors is 5,
(x,y) is a region surrounded by K(0.031,0.53), L(0.031, 4.9), M(0.15,4.9), and N(0.15,4.1).

By setting x and y to values within the above region, the occurrence of cracks can be suppressed, and the strength of the electronic component can be increased.

The inner conductor 3 has protrusions protruding from the first end surface 11 and the second end surface 12.

In the first end surface 11 and the second end surface 12, protrusion distances p1 and p2 of the most protruding inner conductor 3 is preferably 0.10 mm or less, more preferably 0.05 mm or less, and further preferably 0.04 mm or less. The lower limit of the protrusion distances p1 and p2 is not particularly limited, but is preferably as small as possible, and is, for example, 0.03 mm or more or 0.01 mm or more.

In the first end surface 11 and the second end surface 12, a ratio (p1/h2) of the protrusion distance p1 of the most protruding inner conductor to a distance h2 between the first main surface 17 of the inner conductor 3*d* closest to the upper surface 14 of the insulator portion 7 and the second main surface 18 of the inner conductor 3*a* closest to the lower surface 13 of the insulator portion 7 is preferably 0.07 or less, more preferably 0.05 or less, and further preferably 0.04 or less. p1/h2 is, for example, 0.01 or more.

In the first end surface 11 and the second end surface 12, a ratio (p2/w2) of the protrusion distance p2 of the inner conductor 3 to the width w2 of the inner conductor 3 exposed from each end surface in the first end surface 11 and the second end surface 12 is preferably 0.06 or less, more preferably 0.05 or less, and further preferably 0.04 or less. p2/w2 is, for example, 0.01 or more. w2 and p2 of the inner conductor is the width and the protrusion distance of the inner conductor located at the center in the lamination direction among the inner conductors For example, when there are five inner conductors, w2 and p2 are the width and the protrusion distance of the third inner conductor from the upper surface 14 or the lower surface 13. When the number of inner conductors is an even number, each of w2 and p2 is an average of two widths at the center, that is, an average of two widths of inner conductors 3*b* and 3*c* in an example illustrated in the drawing.

The conductive material of the inner conductor 3 is not particularly limited, and examples thereof include Au, Ag, Cu, Pd, and Ni. The material constituting the inner conductor 3 is preferably Ag or Cu and more preferably Ag. The conductive material may be one type only or may be two or more types.

(External Electrode)

The external electrodes 21 and 22 are provided to cover the first end surface 11 and the second end surface 12 of the insulator portion 7.

The conductive material constituting the external electrodes 21 and 22 is not particularly limited, and may be, for example, one or more metal materials selected from Au, Ag, Pd, Ni, Sn, and Cu.

The external electrodes 21 and 22 may be a single layer or a multilayer. In an aspect, the external electrodes 21 and 22 may be a multilayer, preferably, two or more and four or less (i.e., from two to four) layers, for example, three layers.

In an aspect, the external electrodes 21 and 22 are a multilayer, and may include a layer containing Ag or Pd, a layer containing Ni, or a layer containing Sn. In a preferable aspect, the external electrodes 21 and 22 includes a layer containing Ag or Pd, a layer containing Ni, and a layer containing Sn. Preferably, the respective layers are provided in the order of the layer containing Ag or Pd, preferably the layer containing Ag, the layer containing Ni, and the layer containing Sn from the inner conductor side. Preferably, the layer containing Ag or Pd may be a layer on which an Ag paste or a Pd paste has been baked, and the layer containing Ni and the layer containing Sn may be a plating layer.

(Measurement Method)

The height h1 and the width w1 of the insulator portion 7, the sectional area, the thickness t1, and the width w4 of the line portion 4 of the inner conductor 3, the distance t2 between the line portions 4, and the distance h3 between the first main surface 17 of the inner conductor 3*d* closest to the upper surface 14 of the insulator portion 7 and the second main surface 18 of the inner conductor 3*a* closest to the lower surface 13 can be measured as follows.

The periphery of a sample of the electronic component is solidified with a resin so that the WT plane is exposed, and the sample is polished by a polishing machine in an L direction until the substantially central portion of the insulator portion 7 is exposed. After polishing, the cross-section is photographed with a digital microscope. The obtained image is analyzed using image analysis software to obtain the sectional area, the thickness t1, the width w4, the distance t2, and the distance h3 of the inner conductor 3. The height h1 is a height at a substantially central portion in a width direction. The width w1 is a width at a substantially central portion in a height direction. The thicknesses t1 and t2 are thicknesses at the center in the width direction of the inner conductor in the cross-section.

The width w3 of the extended portion of the inner conductor 3 can be measured as follows.

The periphery of a sample of the electronic component is solidified with a resin so that the WT plane is exposed, and the sample is polished by a polishing machine in the L direction until the substantially central portion of the extended portion in the L axis direction is exposed.

After polishing, the cross-section is photographed with a digital microscope. The obtained image is analyzed using image analysis software to obtain the width w3 of the extended portion of the inner conductor 3.

The distance h2 and the protrusion distance p1 can be measured as follows.

The periphery of a sample of the electronic component is solidified with a resin so that the LT plane is exposed, and the sample is polished by a polishing machine in a W direction until the substantially central portion of the inner conductor is exposed. After polishing, the cross-section is photographed with a digital microscope. The obtained image is analyzed using image analysis software to obtain h1 and p1. $p^1$ is a distance from the tip of the most protruding inner conductor with respect to a straight line connecting a contact ×1 between the insulator portion 7 and the first main surface 17 of the inner conductor 3*d* closest to the upper surface 14 of the insulator portion 7 and a contact ×2 between the insulator portion 7 and the second main surface 18 of the inner conductor 3*a* closest to the lower surface 13 of the insulator portion 7 in the obtained cross-section.

The width w2 and the protrusion distance p2 can be measured as follows.

The periphery of a sample of the electronic component is solidified with a resin so that the LW plane is exposed, and the sample is polished by a polishing machine until the substantially central portion in the thickness direction of the inner conductor located at the center in a T direction (the inner conductor 3*b* or 3*c* in the illustrated example) is exposed.

After polishing, the cross-section is photographed with a digital microscope. The obtained image is analyzed using image analysis software to obtain w2 and p2. $p^2$ is a distance from the tip of the inner conductor with respect to a straight line connecting the first end surface or the second end surface of the insulator portion 7 and contacts ×3 and ×4 with the inner conductor 3 in the obtained cross-section.

(Production Method)

A method for producing the electronic component 1 will be described below.

(1) Preparation of Magnetic Material (Calcined Magnetic Powder)

First, raw materials of the magnetic material are prepared. The raw materials of the magnetic material include Fe, Zn, Cu, and Ni as main components. Usually, the main components of the raw materials are substantially composed of oxides of Fe, Zn, Cu, and Ni (ideally, $Fe_2O_3$, ZnO, CuO, and NiO).

As the raw materials, $Fe_2O_3$, ZnO, CuO, NiO, and as necessary, an additive component are weighed to have a predetermined composition, and mixed and pulverized. The obtained powder is dried and calcined to obtain a calcined magnetic powder. Preferably, the obtained calcined magnetic powder is pulverized and micronized.

In the calcined magnetic powder, the Fe content may be preferably 40.0 mol % or more and 49.5 mol % or less (i.e., from 40.0 mol % to 49.5 mol %) (based on the total main components, the same applies hereinafter), and more preferably 45.0 mol % or more and 49.5 mol % or less (i.e., from 45.0 mol % to 49.5 mol %), in terms of $Fe_2O_3$.

In the calcined magnetic powder, the Zn content may be preferably 2.0 mol % or more and 35.0 mol % or less (i.e., from 2.0 mol % to 35.0 mol %) (based on the total main components, the same applies hereinafter), and more preferably 5.0 mol % or more and 30.0 mol % or less (i.e., from 5.0 mol % to 30.0 mol %), in terms of ZnO.

In the calcined magnetic powder, the Cu content is preferably 6.0 mol % or more and 13.0 mol % or less (i.e., from 6.0 mol % to 13.0 mol %) (based on the total main components, the same applies hereinafter), and more preferably 7.0 mol % or more and 10.0 mol % or less (i.e., from 7.0 mol % to 10.0 mol %), in terms of CuO.

In the calcined magnetic powder, the Ni content is not particularly limited, may be the balance of Fe, Zn, and Cu as the other main components described above, and is preferably 10.0 mol % or more and 45.0 mol % or less (i.e., from 10.0 mol % to 45.0 mol %) (based on the total main components, the same applies hereinafter), and more preferably 15.0 mol % or more and 40.0 mol % or less (i.e., from 15.0 mol % to 40.0 mol %), in terms of NiO.

In the present disclosure, the calcined magnetic powder may further contain an additive component. Examples of the additive component in the calcined magnetic powder include Mn, Co, Sn, Bi, and Si, but are not limited thereto. The contents (addition amounts) of Mn, Co, Sn, Bi, and Si are preferably 0.1 parts by mass or more and 1 part by mass or less (i.e., from 0.1 parts by mass to 1 part by mass) in terms of $Mn_3O_4$, $CO_3O_4$, $SnO_2$, $Bi_2O_3$, and $SiO_2$, respectively, with respect to 100 parts by mass of the total of the main components (Fe (in terms of $Fe_2O_3$), Zn (in terms of ZnO), Cu (in terms of CuO), and Ni (in terms of NiO)). The calcined magnetic powder may further contain impurities unavoidable in production.

The Fe content (in terms of $Fe_2O_3$), the Zn content (in terms of ZnO), the Cu content (in terms of CuO), and the Ni content (in terms of NiO) in the calcined magnetic powder may be considered to be substantially the same as the Fe content (in terms of $Fe_2O_3$), the Zn content (in terms of ZnO), the Cu content (in terms of CuO), and the Ni content (in terms of NiO) in the sintered magnetic material after firing.

(2) Preparation of Conductive Paste

A conductive material is prepared. Examples of the conductive material include Au, Ag, Cu, Pd, and Ni, Ag or Cu is preferable, and Ag is more preferable. A conductive paste can be produced by weighing a predetermined amount of powder of a conductive material, kneading the powder with a predetermined amount of a solvent (eugenol or the like), a resin (ethyl cellulose or the like), and a dispersant with a planetary mixer or the like, and then dispersing the kneaded product with a three-roll mill or the like.

(3) Sheet Production

The magnetic materials prepared above are mixed to have a predetermined formulation. These mixtures are put in a ball mill together with, for example, PSZ media, and an organic binder such as a polyvinyl butyral-based binder, an organic solvent such as ethanol or toluene, and a plasticizer are further added and mixed to obtain a slurry. Next, the slurry is molded into a sheet by a doctor blade method or the like, and the sheet is punched into a rectangular shape to produce a green sheet.

The thickness of the green sheet may be, for example, 20 μm or more and 100 μm or less (i.e., from 20 μm to 100 μm), preferably 30 μm or more and 80 μm or less (i.e., from 30 μm to 80 μm), and more preferably 30 μm or more and 60 μm or less (i.e., from 30 μm to 60 μm). By setting the thickness of the green sheet in the above range, high insulation and excellent electrical characteristics can be obtained.

Next, the conductive paste produced above is screen-printed on the green sheet prepared above to form a pattern of an inner conductor.

(4) Lamination, Pressure Bonding, and Individualization

The green sheets obtained above are laminated in a predetermined order to produce a thermocompression-bonded laminated block. The obtained laminated block is cut with a dicer or the like, and individualized to obtain an unfired element body.

(5) Firing

The unfired element body obtained above is fired to obtain an element body of an electronic component.

The firing temperature may be preferably 850° C. or higher and 950° C. or lower, and more preferably 900° C. or higher and 920° C. or lower.

The firing time may be preferably 1 hour or longer and 6 hours or shorter, and more preferably 2 hours or longer and 4 hours or shorter.

After firing, the obtained element body may be placed in a rotary barrel machine together with media and rotated to round a ridge line or a corner of the element body.

(6) Electrode Formation

An underlying electrode is formed. The underlying electrode can be formed by applying a conductive paste containing, for example, Ag and glass to the end surface from which the inner conductor is extended and baking the conductive paste.

The thickness of the underlying electrode may be, for example, 5 μm or more and 80 μm or less (i.e., from 5 μm to 80 μm), preferably 10 μm or more and 70 μm or less (i.e., from 10 μm to 70 μm), and more preferably 40 μm or more and 60 μm or less (i.e., from 40 μm to 60 μm).

The temperature at the time of baking may be, for example, 800° C. or higher and 820° C. or lower.

A coating film of a metal layer is formed on the underlying electrode formed above by electrolytic plating. The coating film may be a single layer or a multilayer, and for example, a Ni coating film may be formed on the underlying electrode, and then a Sn coating film may be formed.

The electronic component 1 of the present disclosure can be produced as described above.

Embodiment 2

Figure 7:
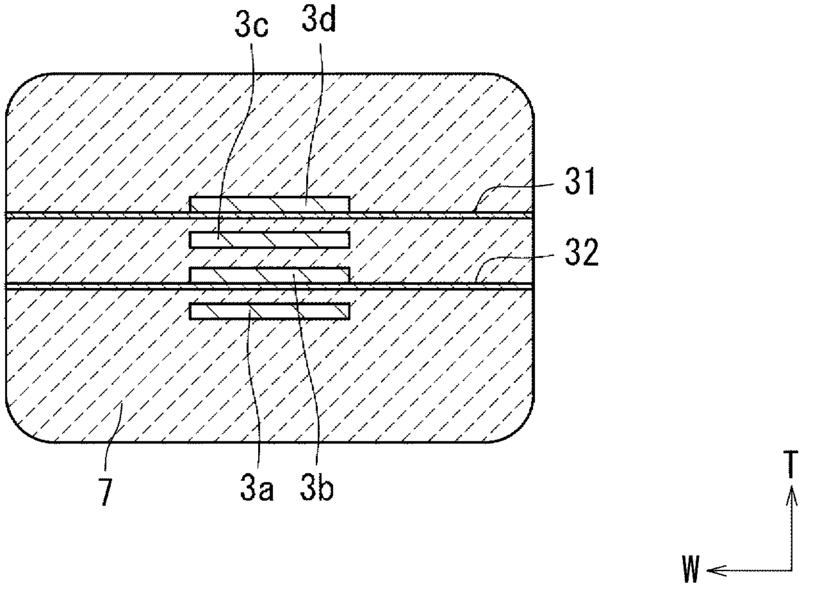
FIG. 7 is a sectional view illustrating an electronic component according to Embodiment 2 of the present disclosure.

FIG. 7 shows a cross-section of an electronic component of Present Embodiment 2. The sectional view of FIG. 7 corresponds to the sectional view of FIG. 4 of Embodiment 1.

As illustrated in FIG. 7, the electronic component of Present Embodiment 2 includes the insulator portion 7 and non-magnetic layers 31 and 32. The other configurations are the same as those of the electronic component 1 of Embodiment 1 described above. The electronic component of the present embodiment has excellent DC superposition characteristics by having a non-magnetic layer.

The non-magnetic layer 31 is disposed between the inner conductors 3*d* and 3*c* to be in contact with the inner conductor 3*d*. Similarly, the non-magnetic layer 32 is disposed between the inner conductors 3*b* and 3*a* to be in contact with the inner conductor 3*b*.

Figure 8:
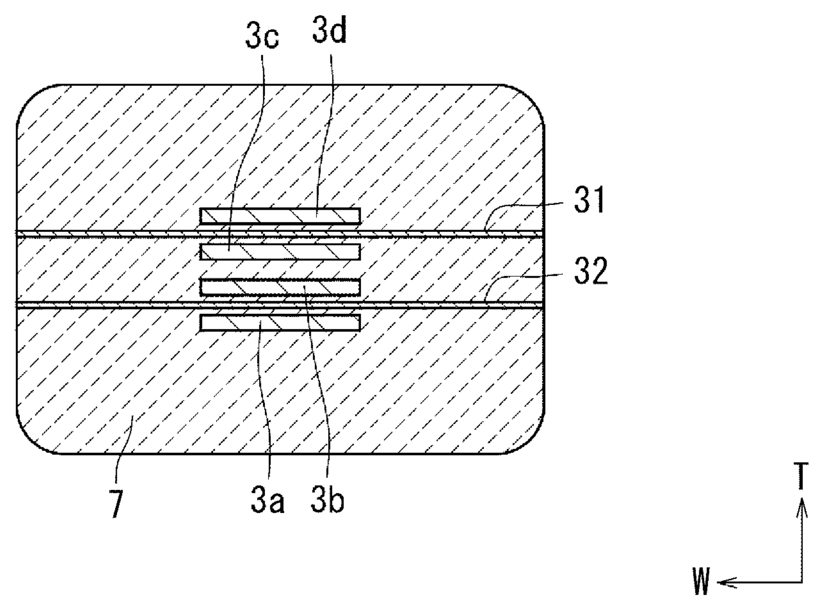
FIG. 8 is a sectional view illustrating an electronic component according to another aspect of Embodiment 2 of the present disclosure.

The position of the non-magnetic layer is not limited to the above. For example, in an aspect, as illustrated in FIG. 8, the non-magnetic layer may be disposed between the inner conductors 3*d* and 3*c* and between the inner conductors 3*b* and 3*a* to be separated from the inner conductors.

In another aspect, the non-magnetic layer may be disposed only at a central portion in the lamination direction of the inner conductors, that is, between the inner conductors 3*c* and 3*b*.

In still another aspect, the non-magnetic layer may be disposed between all the inner conductors.

The non-magnetic layer contains at least Fe, Cu, and Zn.

The non-magnetic layer is configured by a sintered non-magnetic material containing at least Fe, Cu, and Zn as a main component.

In the sintered non-magnetic material, the Fe content may be preferably 40.0 mol % or more and 49.5 mol % or less (i.e., from 40.0 mol % to 49.5 mol %) (based on the total main components, the same applies hereinafter), and more preferably 45.0 mol % or more and 49.5 mol % or less (i.e., from 45.0 mol % to 49.5 mol %), in terms of $Fe_2O_3$.

In the sintered non-magnetic material, the Cu content is preferably 6.0 mol % or more and 13.0 mol % or less (i.e., from 6.0 mol % to 13.0 mol %) (based on the total main components, the same applies hereinafter), and more preferably 7.0 mol % or more and 10.0 mol % or less (i.e., from 7.0 mol % to 10.0 mol %), in terms of CuO.

In the sintered non-magnetic material, the Zn content is not particularly limited, may be the balance of Fe and Cu as the other main components described above, and may be preferably 37.5 mol % or more and 54 mol % or less (i.e., from 37.5 mol % to 54 mol %) (based on the total main components, the same applies hereinafter), and more preferably 40.5 mol % or more and 48 mol % or less (i.e., from 40.5 mol % to 48 mol %), in terms of ZnO.

By setting the contents of Fe, Cu, and Zn in the above ranges, excellent electrical characteristics can be obtained.

In the present disclosure, the sintered non-magnetic material may further contain an additive component. Examples of the additive component in the sintered non-magnetic material include Mn, Co, Sn, Bi, and Si, but are not limited thereto. The contents (addition amounts) of Mn, Co, Sn, Bi, and Si are preferably 0.1 parts by mass or more and 1 part by mass or less (i.e., from 0.1 parts by mass to 1 part by mass) in terms of $Mn_3O_4$, $CO_3O_4$, $SnO_2$, $Bi_2O_3$, and $SiO_2$, respectively, with respect to 100 parts by mass of the total of the main components (Fe (in terms of $Fe_2O_3$), Zn (in terms of ZnO), Cu (in terms of CuO), and Ni (in terms of NiO)). The sintered non-magnetic material may further contain impurities unavoidable in production.

The thickness of each of the non-magnetic layers 31 and 32 is preferably 0.01 mm or more and 0.4 mm or less (i.e., from 0.01 mm to 0.4 mm), more preferably 0.03 mm or more and 0.30 mm or less (i.e., from 0.03 mm to 0.30 mm), and further preferably 0.06 mm or more and 0.20 mm or less (i.e., from 0.06 mm to 0.20 mm).

A method for producing the electronic component of the present embodiment is the same as the method for producing the electronic component 1 of Embodiment 1 described above, except that the method includes a step of providing a non-magnetic layer.

The raw materials of the non-magnetic material include Fe, Cu, and Zn as main components. Usually, the main components of the raw materials are substantially composed of oxides of Fe, Cu, and Zn (ideally, $Fe_2O_3$, CuO, and ZnO).

As the raw materials, $Fe_2O_3$, CuO, ZnO, and as necessary, an additive component are weighed to have a predetermined composition, and mixed and pulverized. The obtained powder is dried and calcined to obtain a calcined non-magnetic powder. Preferably, the obtained calcined non-magnetic powder is pulverized and micronized.

In the calcined non-magnetic powder, the Fe content may be preferably 40.0 mol % or more and 49.5 mol % or less (i.e., from 40.0 mol % to 49.5 mol %) (based on the total main components, the same applies hereinafter), and more preferably 45.0 mol % or more and 49.5 mol % or less (i.e., from 45.0 mol % to 49.5 mol %), in terms of $Fe_2O_3$.

In the calcined non-magnetic powder, the Cu content is preferably 6.0 mol % or more and 13.0 mol % or less (i.e., from 6.0 mol % to 13.0 mol %) (based on the total main components, the same applies hereinafter), and more preferably 7.0 mol % or more and 10.0 mol % or less (i.e., from 7.0 mol % to 10.0 mol %), in terms of CuO.

In the calcined non-magnetic powder, the Zn content may be preferably 37.5 mol % or more and 54 mol % or less (i.e., from 37.5 mol % to 54 mol %) (based on the total main components, the same applies hereinafter), and more preferably 40.5 mol % or more and 48 mol % or less (i.e., from 40.5 mol % to 48 mol %), in terms of ZnO.

The Fe content (in terms of $Fe_2O_3$), the Zn content (in terms of ZnO), the Cu content (in terms of CuO), and the Ni content (in terms of NiO) in the calcined non-magnetic powder may be considered to be substantially the same as the Fe content (in terms of $Fe_2O_3$), the Zn content (in terms of ZnO), the Cu content (in terms of CuO), and the Ni content (in terms of NiO) in the sintered non-magnetic material after firing.

The electronic component of Embodiment 2 can be produced by using the calcined non-magnetic powder to prepare a green sheet in the same manner as the magnetic layer described above, laminating the green sheet at a predetermined position, and then performing individualization, firing, and electrode formation.

Embodiment 3

Figure 9:
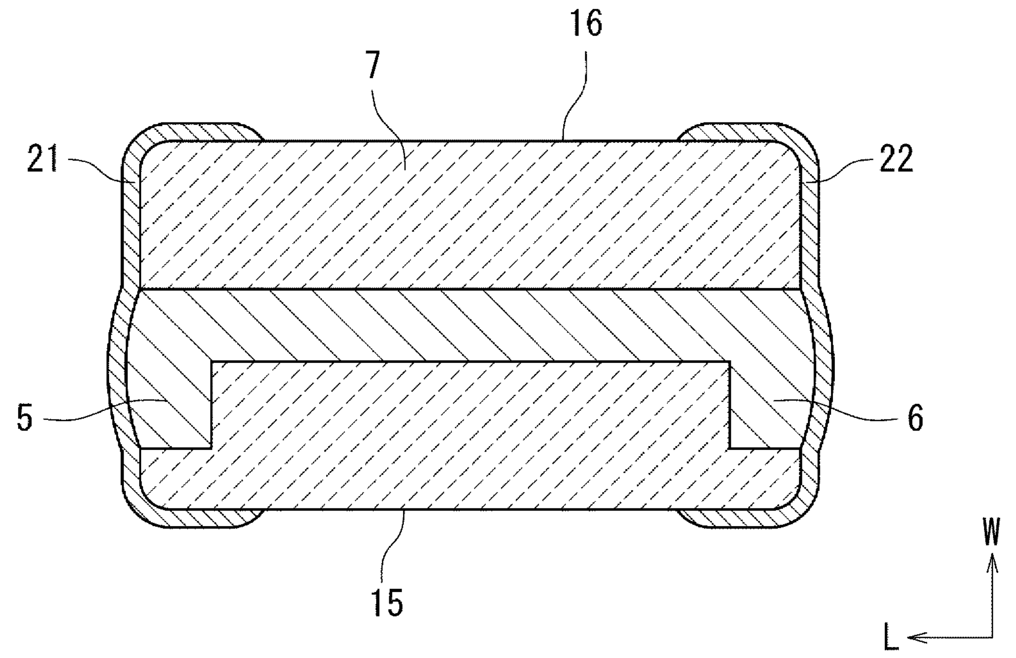
FIG. 9 is a sectional view illustrating an electronic component according to Embodiment 3 of the present disclosure.

FIG. 9 shows a cross-section of an electronic component of Present Embodiment 3. The sectional view of FIG. 9 corresponds to the sectional view of FIG. 2 of Embodiment 1.

As illustrated in FIG. 9, the electronic component of Present Embodiment 3 is similar to the electronic component 1 of Embodiment 1, except that the extended portion is closer to one side surface side.

Embodiment 4

Figure 10:
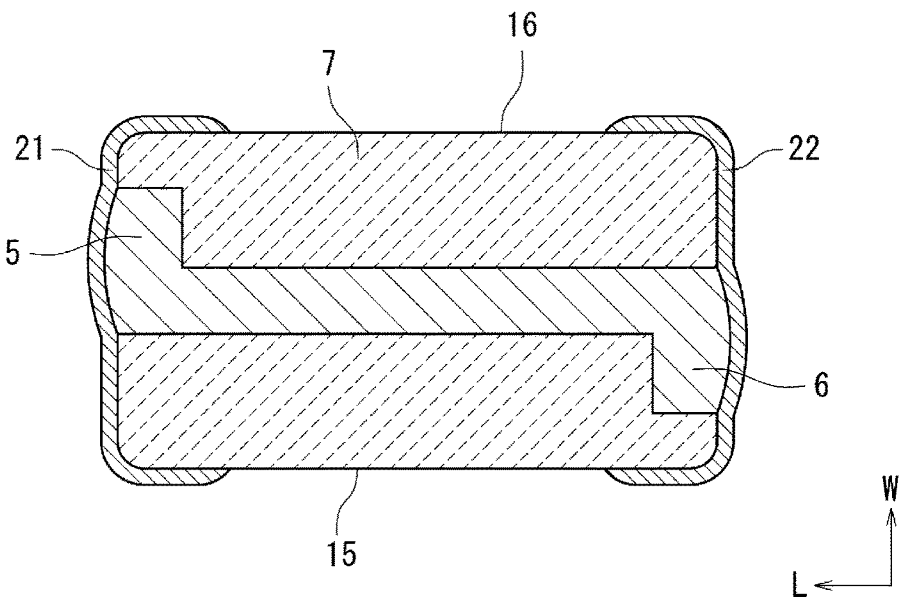
FIG. 10 is a sectional view illustrating an electronic component according to Embodiment 4 of the present disclosure.

FIG. 10 shows a cross-section of an electronic component of Present Embodiment 4. The sectional view of FIG. 10 corresponds to the sectional view of FIG. 2 of Embodiment 1.

As illustrated in FIG. 10, the electronic component of Present Embodiment 4 is similar to the electronic component 1 of Embodiment 1, except that the extended portion is located at the opposite position on the first end surface and the second end surface.

Hereinbefore, one embodiment of the present disclosure has been described, but various modifications can be made on the present embodiment.

Hereinafter, the electronic component of the present disclosure will be described by means of Examples; however, the present disclosure is not limited only to these Examples.

EXAMPLES

Example 1

The internal stress of an electronic component having the following characteristics was calculated using simulation software Femtet (registered trademark) (manufactured by Murata Software Co., Ltd.). A condition that the internal stress exceeds 215 MPa is determined as x, a condition that the internal stress is 215 MPa or less is determined as O, and the results are shown in the following table.

Insulator Composition

Fe—Zn—Cu—Ni ferrite

Inner Conductor

Ag conductor

Dimensions

As shown in the following table. Samples marked with * are comparative examples.

(i) When the number of coil conductors is 3

Figure 11:
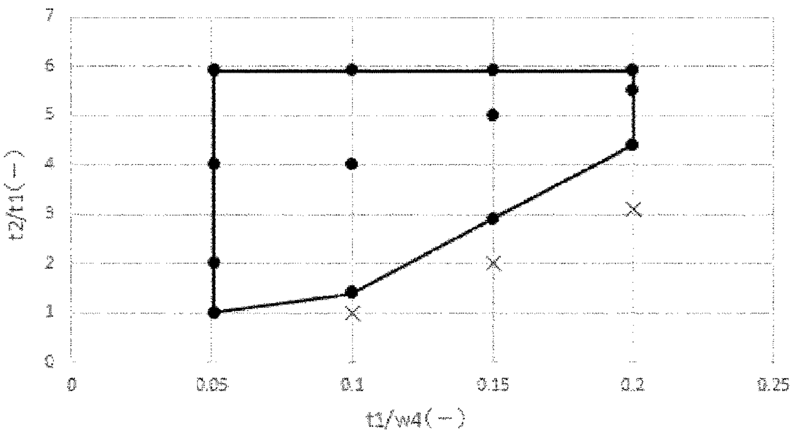
FIG. 11 shows a result when the number of inner conductors is 3 in Examples.

When (x,y) is a region surrounded by A(0.051,1.0), B(0.051,5.9), C(0.2,5.9), D(0.2,4.4), and E(0.1,1.4) (shown in FIG. 11), the internal stress was 215 MPa or less.

(ii) When the number of coil conductors is 4

Figure 12:
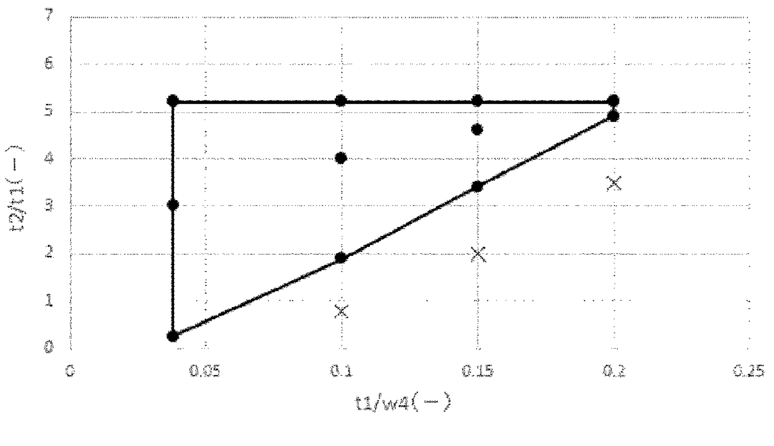
FIG. 12 shows a result when the number of inner conductors is 4 in Examples.

When (x,y) is a region surrounded by F(0.038,0.26), G(0.038,5.2), H(0.2,5.2), I(0.2,4.9), and J(0.1,1.9) (shown in FIG. 12), the internal stress was 215 MPa or less. (iii) When the number of coil conductors is 5

Figure 13:
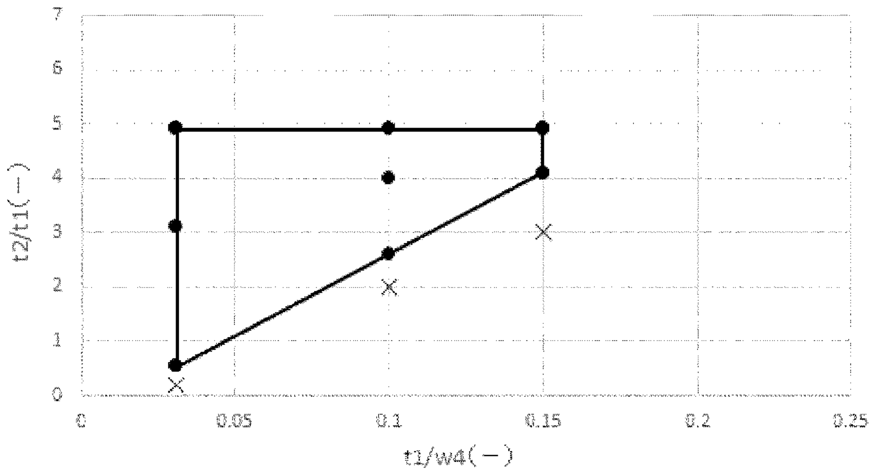
FIG. 13 shows a result when the number of inner conductors is 5 in Examples.

When (x,y) is a region surrounded by K(0.031,0.53), L(0.031,4.9), M(0.15,4.9), and N(0.15,4.1) (shown in FIG. 13), the internal stress was 215 MPa or less.

When (x,y) is a region below the above-described region, the internal stress exceeds 215 MPa, and the risk of occurrence of cracks is high. When (x,y) is above the above-described region, the distance between the inner conductor and the surface of the insulator portion is less than 250 μm, and the strength of the electronic component decreases.

Example 2

Preparation of Magnetic Material

A mixture was obtained by blending $Fe_2O_3$, ZnO, CuO, and NiO in proportions of 48.0 mol %, 21.0 mol %, 8.0 mol

TABLE 1

| Sample No. | Number n of coil conductors | Thickness t1 of coil conductor (mm) | Width w4 of coil conductor (mm) | Distance t2 between coil conductors (mm) | x (t1/w4) | y (t2/t1) | Sectional area of coil conductor ($mm^3$) | Internal stress |
|---|---|---|---|---|---|---|---|---|
| *1 | 3 | 0.085 | 0.43 | 0.26 | 0.20 | 3.1 | 0.11 | x |
| 2 | 3 | 0.085 | 0.43 | 0.37 | 0.20 | 4.4 | 0.11 | ○ |
| 3 | 3 | 0.085 | 0.43 | 0.47 | 0.20 | 5.5 | 0.11 | ○ |
| 4 | 3 | 0.085 | 0.43 | 0.50 | 0.20 | 5.9 | 0.11 | ○ |
| *5 | 3 | 0.08 | 0.53 | 0.16 | 0.15 | 2.0 | 0.13 | x |
| 6 | 3 | 0.08 | 0.53 | 0.23 | 0.15 | 2.9 | 0.13 | ○ |
| 7 | 3 | 0.08 | 0.53 | 0.40 | 0.15 | 5.0 | 0.13 | ○ |
| 8 | 3 | 0.08 | 0.53 | 0.47 | 0.15 | 5.9 | 0.13 | ○ |
| *9 | 3 | 0.08 | 0.80 | 0.06 | 0.10 | 1.0 | 0.19 | x |
| 10 | 3 | 0.08 | 0.80 | 0.11 | 0.10 | 1.4 | 0.19 | ○ |
| 11 | 3 | 0.08 | 0.80 | 0.32 | 0.10 | 4.0 | 0.19 | ○ |
| 12 | 3 | 0.08 | 0.80 | 0.47 | 0.10 | 5.9 | 0.19 | ○ |
| 13 | 3 | 0.08 | 1.57 | 0.08 | 0.051 | 1.0 | 0.38 | ○ |
| 14 | 3 | 0.08 | 1.57 | 0.16 | 0.051 | 2.0 | 0.38 | ○ |
| 15 | 3 | 0.08 | 1.57 | 0.32 | 0.051 | 4.0 | 0.38 | ○ |
| 16 | 3 | 0.08 | 1.57 | 0.47 | 0.051 | 5.9 | 0.38 | ○ |
| *17 | 4 | 0.075 | 0.38 | 0.26 | 0.20 | 3.5 | 0.11 | x |
| 18 | 4 | 0.075 | 0.38 | 0.37 | 0.20 | 4.9 | 0.11 | ○ |
| 19 | 4 | 0.075 | 0.38 | 0.39 | 0.20 | 5.2 | 0.11 | ○ |
| *20 | 4 | 0.07 | 0.47 | 0.14 | 0.15 | 2.0 | 0.13 | x |
| 21 | 4 | 0.07 | 0.47 | 0.24 | 0.15 | 3.4 | 0.13 | ○ |
| 22 | 4 | 0.07 | 0.47 | 0.32 | 0.15 | 4.6 | 0.13 | ○ |
| 23 | 4 | 0.07 | 0.47 | 0.36 | 0.15 | 5.2 | 0.13 | ○ |
| *24 | 4 | 0.06 | 0.6 | 0.048 | 0.10 | 0.8 | 0.14 | x |
| 25 | 4 | 0.06 | 0.6 | 0.11 | 0.10 | 1.9 | 0.14 | ○ |
| 26 | 4 | 0.06 | 0.6 | 0.24 | 0.10 | 4.0 | 0.14 | ○ |
| 27 | 4 | 0.06 | 0.6 | 0.31 | 0.10 | 5.2 | 0.14 | ○ |
| 28 | 4 | 0.05 | 1.3 | 0.013 | 0.038 | 0.26 | 0.26 | ○ |
| 29 | 4 | 0.05 | 1.3 | 0.15 | 0.038 | 3.0 | 0.26 | ○ |
| 30 | 4 | 0.05 | 1.3 | 0.26 | 0.038 | 5.2 | 0.26 | ○ |
| *31 | 5 | 0.06 | 0.4 | 0.18 | 0.15 | 3.0 | 0.12 | x |
| 32 | 5 | 0.06 | 0.4 | 0.25 | 0.15 | 4.1 | 0.12 | ○ |
| 33 | 5 | 0.06 | 0.4 | 0.29 | 0.15 | 4.9 | 0.12 | ○ |
| *34 | 5 | 0.06 | 0.6 | 0.12 | 0.10 | 2 | 0.18 | x |
| 35 | 5 | 0.06 | 0.6 | 0.156 | 0.10 | 2.6 | 0.18 | ○ |
| 36 | 5 | 0.06 | 0.6 | 0.24 | 0.10 | 4.0 | 0.18 | ○ |
| 37 | 5 | 0.06 | 0.6 | 0.29 | 0.10 | 4.9 | 0.18 | ○ |
| *38 | 5 | 0.055 | 1.77 | 0.011 | 0.031 | 0.20 | 0.49 | x |
| 39 | 5 | 0.055 | 1.77 | 0.029 | 0.031 | 0.53 | 0.49 | ○ |
| 40 | 5 | 0.055 | 1.77 | 0.17 | 0.031 | 3.1 | 0.49 | ○ |
| 41 | 5 | 0.055 | 1.77 | 0.27 | 0.031 | 4.9 | 0.49 | ○ |

%, and 23.0 mol %, respectively. The mixture was wet-mixed, pulverized, and then dried to remove moisture. The obtained dried product was calcined at a temperature of 800° C. for 2 hours to obtain a magnetic material.

Preparation of Non-Magnetic Material

A mixture was obtained by blending $Fe_2O_3$, ZnO, and CuO in proportions of 48.0 mol %, 44.0 mol %, and 8.0 mol %, respectively. The mixture was wet-mixed, pulverized, and then dried to remove moisture. The obtained dried product was calcined at a temperature of 800° C. for 2 hours to obtain a non-magnetic material.

Preparation of Conductive Paste

Ag powder was kneaded with a predetermined amount of each of a solvent, a resin, and a dispersant with a planetary mixer, and then dispersed with a three-roll mill to produce a conductive paste.

Production of Green Sheet

The obtained magnetic material and non-magnetic material were put in a ball mill together with a predetermined amount of each of an organic binder such as a polyvinyl butyral-based binder, an organic solvent such as ethanol or toluene, and a plasticizer, and then mixed.

Next, the mixture was molded into a sheet having a film thickness of about 25 μm by a doctor blade method, and this sheet was punched into a rectangular shape to produce a magnetic green sheet and a non-magnetic green sheet. The conductive paste was screen-printed on the green sheet to form a pattern of an inner conductor.

Production of Electronic Component

The green sheets obtained above were laminated to have a shape of FIGS. 1 to 4 (Sample No. 42) and a shape of FIG. 7 (Sample No. 43), thereby producing a thermocompression-bonded laminated block. The obtained laminated block was cut with a dicer, and individualized to obtain an unfired element body.

The unfired element body obtained above was fired at a top temperature of 920° C. for 4 hours to obtain an element body of an electronic component. After firing, the obtained element body was placed in a rotary barrel machine together with media and rotated to round a ridge line or a corner of the element body.

An underlying electrode was formed by applying a conductive paste containing Ag and glass to the end surface of the element body obtained above and baking the conductive paste at 820° C., thereby obtaining electronic components of Sample No. 42 (without a non-magnetic layer) and Sample No. 43 (with a non-magnetic layer).

The number of inner conductors of the produced electronic component was 4, the thickness and the width of the inner conductor were 0.06 mm and 1.0 mm, respectively, and the distance between the inner conductors was 0.11 mm. The size of the produced electronic component was 3.2 mm in length (L), 2.5 mm in width (W), and 2.0 mm in height (T).

Evaluation

Figure 14:
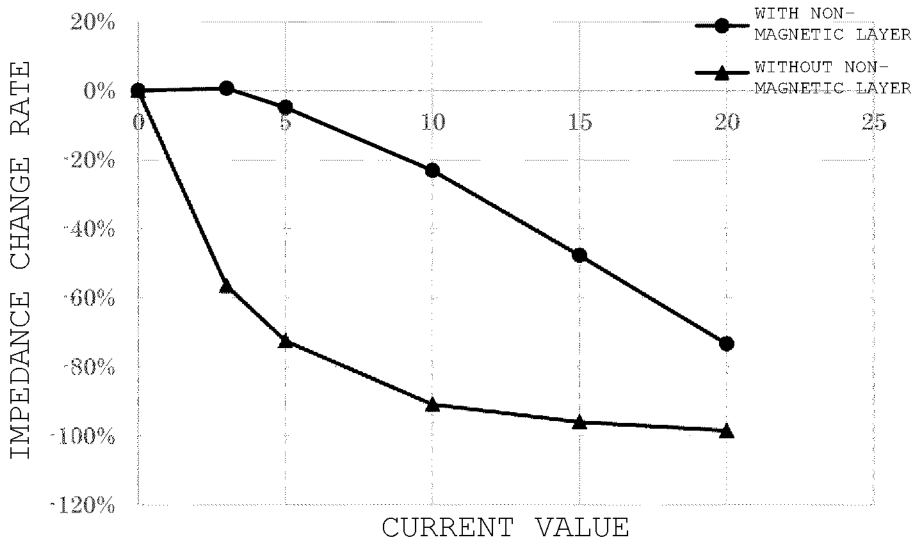
FIG. 14 shows results of measuring impedance in Examples.

For the obtained Sample No. 42 and Sample No. 43, a direct current was applied up to 20A and the impedance was measured. The results are shown in FIG. 14. As shown in the results of FIG. 14, by disposing the non-magnetic layer between the inner conductors, a decrease in impedance in the case of no superimposed current can be reduced, and a decrease in impedance when a direct current is superimposed can be suppressed.

The electronic component of the present disclosure may be used for various use applications, for example, as an impedance element or an inductor.

What is claimed is:

1. An electronic component comprising:
- an insulator portion in which a plurality of insulating layers are laminated;
- a plurality of inner conductors each having a strip shape and embedded in the insulator portion; and
- a first external electrode and a second external electrode which face an outer surface of the insulator portion and are electrically connected to the inner conductors,
- a number of the inner conductors being from 3 to 5 and the inner conductors being laminated with the insulating layers interposed therebetween,
- a total sectional area of the plurality of inner conductors being from 0.1 $mm^2$ to 0.5 $mm^2$, and
- when a thickness and a width of the inner conductor are designated as t1 and w4, respectively, a distance between the inner conductors is designated as t2, t1/w4 is designated as x, and t2/t1 is designated as y,
- (i) when the number of the inner conductors is 3,
- (x,y) being a region surrounded by A(0.051, 1.0), B(0.051, 5.9), C(0.2,5.9), D(0.2,4.4), and E(0.1,1.4),
- (ii) when the number of the inner conductors is 4,
- (x,y) being a region surrounded by F(0.038, 0.26), G(0.038, 5.2), H(0.2,5.2), I(0.2,4.9), and J(0.1,1.9), and
- (iii) when the number of the inner conductors is 5,
- (x,y) being a region surrounded by K(0.031, 0.53), L(0.031, 4.9), M(0.15,4.9), and N(0.15,4.1).

2. The electronic component according to claim 1, wherein
- each of the inner conductors has a line portion and a first extended portion and a second extended portion located at both ends of the line portion,
- a ratio of a width of each of the first extended portion and the second extended portion to a width of the insulator portion is from 0.4 to 1.0.

3. The electronic component according to claim 2, wherein
- a height of the insulator portion is from 1.8 mm to 2.2 mm, and a width of the insulator portion is from 2.3 mm to 2.7 mm.

4. The electronic component according to claim 3, wherein
- the insulating layer includes a magnetic layer,
- the magnetic layer containing
- Fe being from 40 mol % to 49.5 mol % in terms of $Fe_2O_3$,
- Zn being from 2 mol % to 35 mol % in terms of ZnO,
- Cu being from 6 mol % to 13 mol % in terms of CuO, and
- Ni being from 10 mol % to 45 mol % in terms of NiO.

5. The electronic component according to claim 4, wherein
- the insulating layer includes a non-magnetic layer.

6. The electronic component according to claim 3, wherein
- the insulating layer includes a non-magnetic layer.

7. The electronic component according to claim 2, wherein
- the insulating layer includes a magnetic layer,
- the magnetic layer containing
- Fe being from 40 mol % to 49.5 mol % in terms of $Fe_2O_3$,
- Zn being from 2 mol % to 35 mol % in terms of ZnO,
- Cu being from 6 mol % to 13 mol % in terms of CuO, and
- Ni being from 10 mol % to 45 mol % in terms of NiO.

8. The electronic component according to claim 7, wherein the insulating layer includes a non-magnetic layer.

9. The electronic component according to claim 2, wherein the insulating layer includes a non-magnetic layer.

10. The electronic component according to claim 9, wherein the non-magnetic layer contains Fe being from 40 mol % to 49.5 mol % in terms of $Fe_2O_3$, Cu being from 6 mol % to 13 mol % in terms of CuO, and Zn being from 37.5 mol % to 54 mol % in terms of ZnO.

11. The electronic component according to claim 1, wherein a height of the insulator portion is from 1.8 mm to 2.2 mm, and a width of the insulator portion is from 2.3 mm to 2.7 mm.

12. The electronic component according to claim 11, wherein the insulating layer includes a magnetic layer, the magnetic layer containing Fe being from 40 mol % to 49.5 mol % in terms of $Fe_2O_3$, Zn being from 2 mol % to 35 mol % in terms of ZnO, Cu being from 6 mol % to 13 mol % in terms of CuO, and Ni being from 10 mol % to 45 mol % in terms of NiO.

13. The electronic component according to claim 12, wherein the insulating layer includes a non-magnetic layer.

14. The electronic component according to claim 11, wherein the insulating layer includes a non-magnetic layer.

15. The electronic component according to claim 14, wherein the non-magnetic layer contains Fe being from 40 mol % to 49.5 mol % in terms of $Fe_2O_3$, Cu being from 6 mol % to 13 mol % in terms of CuO, and Zn being from 37.5 mol % to 54 mol % in terms of ZnO.

16. The electronic component according to claim 1, wherein the insulating layer includes a magnetic layer, the magnetic layer containing Fe being from 40 mol % to 49.5 mol % in terms of $Fe_2O_3$, Zn being from 2 mol % to 35 mol % in terms of ZnO, Cu being from 6 mol % to 13 mol % in terms of CuO, and Ni being from 10 mol % to 45 mol % in terms of NiO.

17. The electronic component according to claim 16, wherein the insulating layer includes a non-magnetic layer.

18. The electronic component according to claim 17, wherein the non-magnetic layer contains Fe being from 40 mol % to 49.5 mol % in terms of $Fe_2O_3$, Cu being from 6 mol % to 13 mol % in terms of CuO, and Zn being from 37.5 mol % to 54 mol % in terms of ZnO.

19. The electronic component according to claim 1, wherein the insulating layer includes a non-magnetic layer.

20. The electronic component according to claim 19, wherein the non-magnetic layer contains Fe being from 40 mol % to 49.5 mol % in terms of $Fe_2O_3$, Cu being from 6 mol % to 13 mol % in terms of CuO, and Zn being from 37.5 mol % to 54 mol % in terms of ZnO.

* * * * *